US009578372B2

(12) United States Patent
Xu et al.

(10) Patent No.: US 9,578,372 B2
(45) Date of Patent: Feb. 21, 2017

(54) DELAY TOLERANT DECODER

(71) Applicant: Cisco Technology, Inc., San Jose, CA (US)

(72) Inventors: Guang Xu, Anhui (CN); Bin Zhu, Jiangsu (CN); Ling Zhang, Anhui (CN); Ling Zhu, Anhui (CN); Yongze Xu, Anhui (CN)

(73) Assignee: Cisco Technology, Inc., San Jose, CA (US)

(*) Notice: Subject to any disclaimer, the term of this patent is extended or adjusted under 35 U.S.C. 154(b) by 501 days.

(21) Appl. No.: 14/039,515

(22) Filed: Sep. 27, 2013

(65) Prior Publication Data
US 2015/0092832 A1    Apr. 2, 2015

(51) Int. Cl.
| H04N 19/31 | (2014.01) |
| H04N 19/187 | (2014.01) |
| H04N 19/136 | (2014.01) |
| H04N 21/44 | (2011.01) |
| H04N 21/43 | (2011.01) |
| H04N 21/434 | (2011.01) |
| H04N 21/439 | (2011.01) |
| H04N 21/647 | (2011.01) |
| H04N 19/91 | (2014.01) |

(52) U.S. Cl.
CPC .... *H04N 21/44004* (2013.01); *H04N 21/4302* (2013.01); *H04N 21/434* (2013.01); *H04N 21/4344* (2013.01); *H04N 21/4392* (2013.01); *H04N 21/6473* (2013.01); *H04N 21/64738* (2013.01)

(58) Field of Classification Search
CPC .... H04N 19/89; H04N 19/154; H04N 19/192; H04N 19/188; H04N 19/91; H04N 19/31; H04N 19/146; H04N 19/187
See application file for complete search history.

(56) References Cited

U.S. PATENT DOCUMENTS

| 3,670,249 A | 6/1972 | Meslener |
| 3,815,031 A | 6/1974 | Kirner |
| 4,169,264 A | 9/1979 | Parker |
| 5,313,422 A | 5/1994 | Houston |
| 5,391,941 A | 2/1995 | Landry |
| 6,650,624 B1 | 11/2003 | Quigley et al. |
| 6,848,013 B2 | 1/2005 | Suh et al. |
| 8,332,736 B2 | 12/2012 | Mohan |
| 8,385,413 B2 | 2/2013 | Chen |
| 2005/0276318 A1* | 12/2005 | Bokhour ........... G01S 13/76 375/219 |

(Continued)

*Primary Examiner* — Obafemi Sosanya
(74) *Attorney, Agent, or Firm* — Lempia Summerfield Katz LLC

(57) ABSTRACT

In one implementation, a network device receives a series of video frames spanning a series time period from a network. The time period may be static of a specific duration or identified dynamically based on the timing of the video frames. The network device decodes the series of video frames and stores the decoded series of data frames in memory along with associated timestamps. A pause phenomenon in excess of expected delay is identified between two of the decoded video frames. The network device forwards or displays the series of decoded frames such that each successive pair of frames in the series of decoded frames are spaced by a resultant delay period that is less than a duration of the pause phenomenon.

20 Claims, 8 Drawing Sheets

(56) References Cited

U.S. PATENT DOCUMENTS

| | | | |
|---|---|---|---|
| 2007/0171976 A1* | 7/2007 | Toma | H04N 21/23614 375/240.15 |
| 2012/0147973 A1* | 6/2012 | Wu | H04N 19/188 375/240.25 |
| 2014/0334557 A1* | 11/2014 | Schierl | H04N 19/91 375/240.27 |

* cited by examiner

DELAY TOLERANT DECODER

TECHNICAL FIELD

This disclosure relates in general to the field of video decoding, and more specifically, to an algorithm for minimizing the perception of delay in the display of decoded video.

BACKGROUND

Various standards have been developed in recent years for video encoding and compression in applications such as videoconferencing, digital storage media, television broadcasting, internet streaming, and other network communications. Image frames are encoded and/or compressed at one end of a transmission and decoded and/or decompressed at the other end of the transmission. The encoded or compressed version of the image frames are easily transmitted or stored. Data streams in the transmission may suffer from various types of errors. The errors may include noise in the transmission, packet loss in the network, device malfunctions, or delays.

Delays may be caused by the network or from hardware decoding. Delay from the network may occur when one or more video frames must be retransferred because of the errors (e.g., the frames were not received or were damaged). The time necessary to decode one or more video frames may undesirably be greater than normal or as expected.

BRIEF DESCRIPTION OF THE DRAWINGS

Exemplary embodiments of the present embodiments are described herein with reference to the following drawings.

FIG. 3 illustrates an example pre-detecting phase for delay tolerant decoding.

DESCRIPTION OF EXAMPLE EMBODIMENTS

Overview

Figure 1:
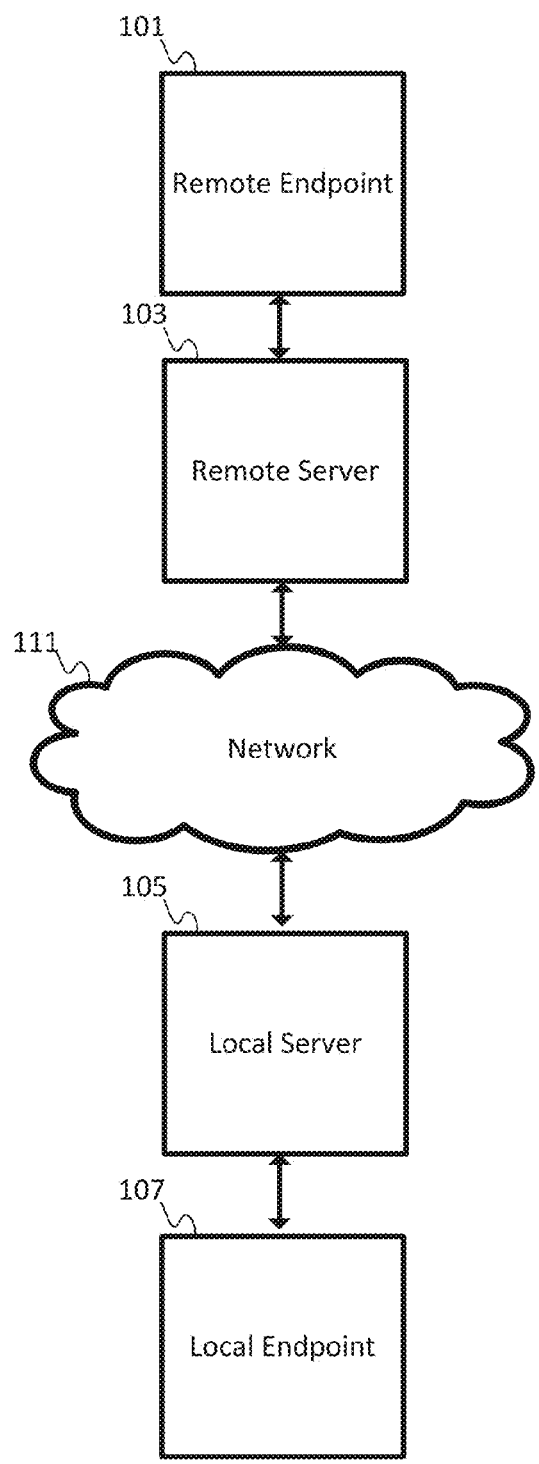

In one embodiment, a series of video frames spanning a predetermined series time period are received from a network. The video frames may be network abstraction layer (NAL) units. The series of video frames are decoded, and the decoded video frames are stored in a buffer. A time pause between two of the decoded video frames is identified and the series of decoded frames are displayed such that at least one additional pair of decoded frames in the series of decoded frames are spaced by a resultant delay period that is allocated from the time pause and less than the time pause.

Example Embodiments

Real time video applications require fluid decoding and displaying. Real time video applications include video conferences, video streaming, television broadcasting, and other forms of communication. One example standard for the recording, compression, and distribution of video is H.264/MPEG-4, which is described by the International Telecommunication Union Standardization Section (ITU-T) as T-REC-H.264-201304-I in April 2013 and available at http://www.itu.int/rec/T-REC-H.264-201304-I ("H.264"). Other video coding standards may be used. The video coding standard may organize data into network abstraction layer (NAL) units. A NAL unit is a packet that includes a specified number of bytes. The first byte is a header, which defines the type of data in the NAL unit, and the remaining bytes form the payload data of that type of data. Other packet formats may be used. The NAL unit structure may be a versatile format for use in both packet transport systems and bit stream transport systems.

In any video coding standard, delays may be introduced into the video stream because of abnormal decoding behavior of hardware that performs the decoding. The delays may contribute to pause phenomena such as freezing video, jerking video, distorted (e.g., pixelated) video, or other disruptions in the video stream displayed to the user. In one example, the abnormal decoding behavior may be attributed to the network. When the network experiences dropped packets, device failures, or the status of the network is bad for another reason, data may be lost. As a result, one or more NAL units may be delayed or retransmitted, which also causes delay.

In another example, the abnormal decoding behavior may be attributed to the amount of time needed to process special frames or specific types of NAL units. H.264 decoding may reach speeds of 30 frames per second or higher according to some hardware manufacturers. However, in these same data streams, the time interval between some adjacent decoded frames is larger than 200 milliseconds. The additional time between frames is attributed to the decoding time of hardware for some special frames or control frames. Examples include sequence parameter set (SPS) and the picture parameter set (PPS). The SPS NAL unit and the PPS NAL unit may include specifications for the resolution and frame rate of the video. The SPS NAL unit may include data that defines the coded video sequence for a series of frames as defined by H.264. The PPS NAL unit may include parameters that define a picture with the coded video sequence for one of the frames as defined by H.264. Other special frames may be used.

Because decoding time of hardware for each frame is controlled by the hardware or the operating system manufacturer, any fix or patch for the abnormal delay caused by hardware is often also made by the hardware or the operating system manufacturer. The following embodiments include a delay tolerant algorithm to improve the pausing phenomenon at the application level, which is not dependent on a fix or patch from the hardware or the operating system manufacturer. The delay tolerant algorithm corrects or disguises delays in real time regardless of whether the delays are caused by the network or from hardware decoding.

FIG. 1 illustrates an example system for delay tolerant communication. The system includes a remote endpoint 101, a remote server 103, a local server 105, and a local endpoint 107. The remote server 103 and the local server 105 may be connected directly or through the network 111. Additional, different, or fewer devices or components may be included in the system for delay tolerant communication. The remote endpoint 101 and the local endpoint 107 are configured to encode, decode, compress, and/or decompress video data according to one or more video coding standards and delay tolerant algorithms. Each of the remote endpoint 101 and the local endpoint 107 may be a smart phone, a mobile phone, a personal digital assistant ("PDA"), a tablet computer, a notebook computer, and/or any other known or later developed portable or mobile computing device.

In one example, the local endpoint 107 receives a video stream as a series of video frames from the remote endpoint 101 via the network 111. The video stream may be analyzed in small amounts of time. The local endpoint 107 defines a series time period for removing delay from the video stream. The series time period is the duration of the series of video frames under analysis. The series time period may be a moving window (e.g., as one video frame moves out of the window, another video frame moves into the window) or a static window (e.g., video frames for the series time period and removed all at once).

The local endpoint 107 is configured to decode the series of video frames and store the decoded video frames in a buffer or memory. The local endpoint 107 is configured to identify a time pause between two of the decoded video frames. The time pause may be greater than a threshold related to an expected amount of time between frames. For example, in a 30 frames per second video stream, the time between frames will be about 33 milliseconds with some amount of tolerance. The threshold in this example may be set to 50 milliseconds, 100 milliseconds, 200 milliseconds, or another value. Accordingly, the local endpoint 107 compares the time between adjacent decoded video frames in the buffer to the threshold.

When any two adjacent decoded video frames are spaced apart by more than the threshold, the user may be experiencing a pausing phenomenon. To minimize these effects, the local endpoint 107 is configured to spread the delay among additional frames in the video stream. For example, the local endpoint 107 may move the spaced apart video frames closer in time and move other video frames farther apart in time to compensate. Various techniques may be used to spread the delay among the decoded video frames in the buffer such that each successive pair of frames in the series of decoded frames are spaced by a resultant delay period that is less than the original time pause. Accordingly, the video frames are displayed at a rate less than real time, but the significant delay that causes noticeable delay for one frame is minimized. The local endpoint 107 is configured to display the series of decoded frames using the resultant delay period between one or more pairs of adjacent video frames.

In one alternative, the local endpoint 107 is configured to identify a time pause between two of the decoded video frames by the type of frame rather than a measurement of time. For example, the algorithm may assume that configuration set NAL units cause delay because of the addition processing time required for configuration set NAL units. For example, video stream configuration based on the SPS or PPS require more time than the average NAL unit to decode.

Accordingly, the local endpoint 107 may be configured to parse or analyze the NAL unit to determine whether the NAL unit includes a configuration set. In response to the determination of the configuration set, the local endpoint 107 is configured to look up a corresponding time pause in a lookup table. The local endpoint 107 is configured to allocate portions of the corresponding time pause to other NAL units to spread out the delay such that the observer will not notice the delay.

Figure 2:
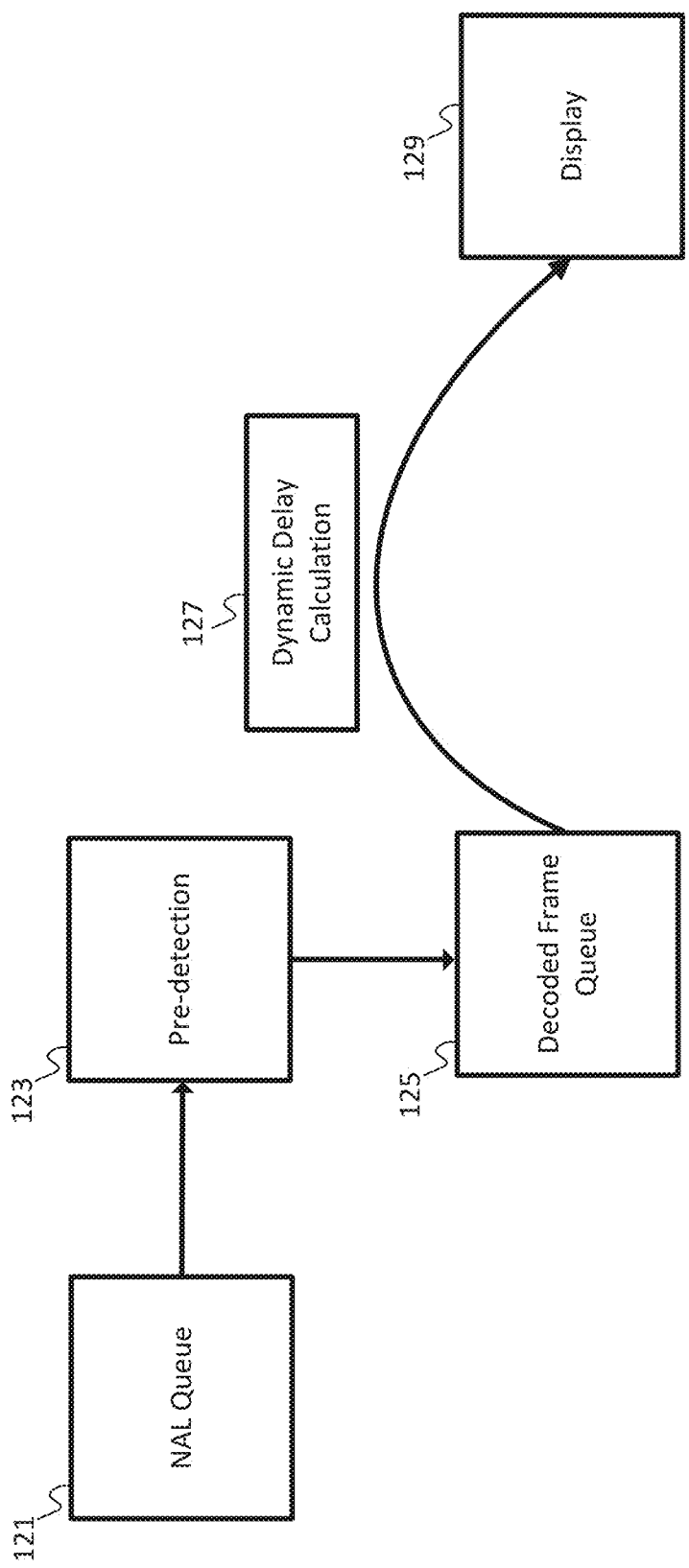
FIG. 2 illustrates an example block diagram for delay tolerant decoding.
Figure 3:
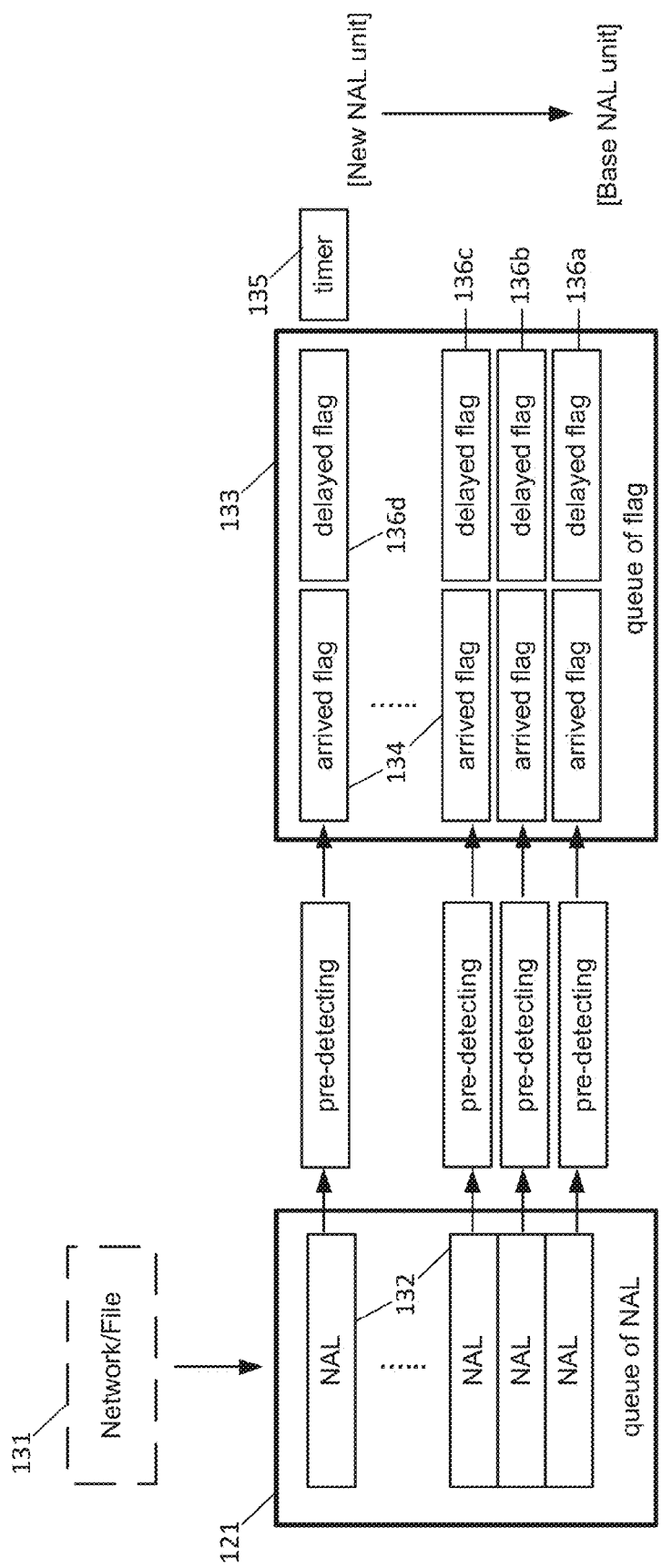
FIG. 3 illustrates an example system for delay tolerant communication.

FIG. 2 illustrates an example block diagram for delay tolerant decoding. The block diagram includes NAL queue 121, pre-detection 123, decoded frame queue 125, and display 129. The dynamic delay calculation for delay tolerant decoding is shown by block 127. The components and algorithms underlying this block diagram may be included in local endpoint 107. However, portions may also be included in the local server 105 or the remote server 103. Alternatively, components and algorithms underlying this block diagram may be included across multiple devices. FIG. 3 illustrates an example pre-detecting phase for the block diagram of FIG. 2.

The NAL queue 121 includes memories, buffers, or other logical storage elements that stores a series of NAL units 132, as shown in FIG. 3. The NAL units 132 are received from a network connection or a file 131. In pre-detection 123, the NAL units 132 in the NAL queue 121 are parsed and analyzed. The arrival time for each NAL unit 132 is recorded and stored in memory. If there is no error in the NAL unit 132, an arrived flag 134 for the NAL unit 132 is set to "true" or "high." Potential errors for the NAL unit 132 include syntax errors or an incomplete NAL unit. The syntax error may be a bit error or violation in the formatting of the NAL unit. An incomplete NAL may be missing a header, a portion of the payload, or have an inappropriate number of bits or bytes.

As each NAL unit 132 with no errors is assigned a true arrived flag, a timer 135 is assigned to the entry. The timer 135 records elapsed time until the next NAL unit 132 with no errors is received and assigned a true arrived flag. The timer 135 is compared to a timeout threshold. The timeout threshold may be assigned according to the video coding standard. The timeout threshold may be assigned according to the speed of the connection, the network 111, or the capabilities of the local server 105 or local endpoint 107. Alternatively, the timeout threshold may be a function of the rate or speed of the video stream. For example, the timeout threshold may be 110%, 150%, 200% or another ratio of the expected time between adjacent frames. Example timeout thresholds include 10 ms, 50 ms, 100 ms, or another time value. As the NAL units 132 are received, a new timer 135 is set between each consecutive pair of NAL units 132. When the timer 135 reaches the timeout threshold between any consecutive pair of NAL units, a delay flag of entries from the first NAL unit to the entry that timed out is set to "true" or "high."

For example, the delayed flag 136a is set to "low" or "false" when the first NAL unit arrives in FIG. 3. The first NAL unit, or base NAL unit, is shown at the bottom of the NAL queue 121 in FIG. 3. The timer 135 increases as a function of time. The second NAL unit is received before the timeout threshold is reached. Therefore, the delayed flag 136b is also set to false. The third NAL unit is received before the timeout threshold is reached. Therefore, the delayed flag 136c is also set to false. The fourth NAL unit, however, does not arrive (or at least the corresponding arrive flag is not set to high) before the timeout threshold is reached. Therefore, the delayed flag 136d is set to high. In addition, all of the other delayed flags between the first delayed flag 136a and delayed flag 136e are also set to high. The other delayed flags between the first delayed flag 136a and delayed flag 136e include delayed flag 136b and delayed flag 136c and any other delayed flags for intervening NAL units in the group. This indicates that all of the corresponding NAL units in the group will undergo delay tolerant decoding.

The group may be defined statically or dynamically. When the group is static, a predetermined number of NAL units are included in the group. Example numbers of NAL units include 5, 10, 100, or any number of NAL units. When the group is dynamic, the size of the group may be a function of the amount of delay between NAL units. For example, the group may extend from the base NAL unit until a delay greater than the timeout threshold is detected.

Returning to FIG. 2, the group of NAL units are decoded and stored in the decoded frame queue 125. The NAL units are read from the decoded frame queue 125 in order to be displayed, transmitted to another device, or for further processing. The NAL units are examined to determine the status of the delayed flags. For NAL units with false delayed flags, the NAL units are fetched or forwarded without any further calculation. However, for NAL units with delayed flags set to true, indicating that one or more gaps between adjacent NAL units in the group exceeded the timeout threshold, the delay tolerant algorithm, as shown by dynamic delay calculation 127, is applied to the group of NAL units, before the NAL units are forwarded, further processed, or presented on the display 129.

Figure 4:
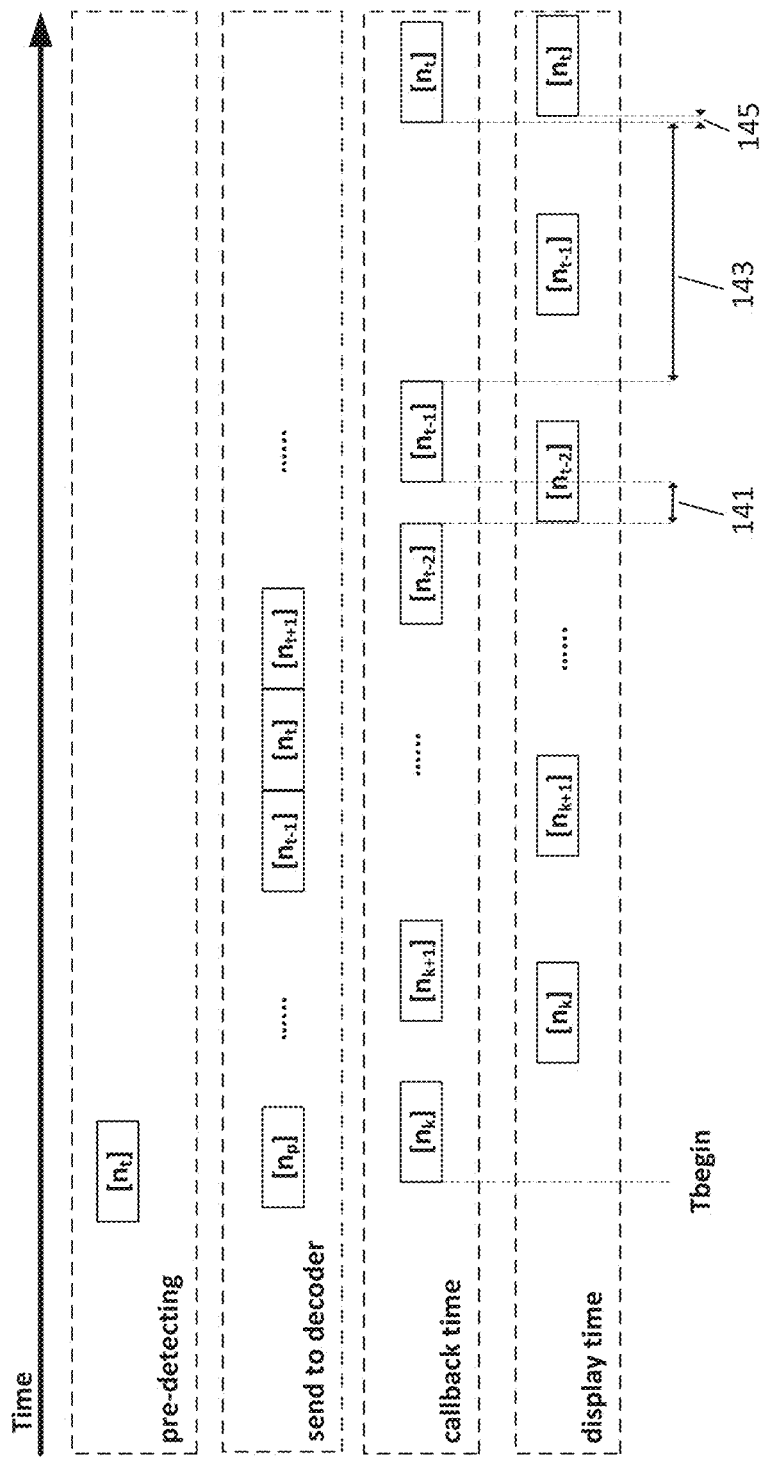
FIG. 4 illustrates an example timing diagram for delay tolerant decoding.

FIG. 4 illustrates an example timing diagram for delay tolerant decoding or the dynamic delay calculation 127. FIG. 4 illustrates the timing and parsing of the NAL units in the pre-detection 123, timing of the NAL units stored in the decoded frame queue 125, and the display of NAL units. In the pre-detecting phase, a base NAL unit $N_t$ is received. The base NAL unit $N_t$ is sent to the decoder. Prior to the base NAL unit $N_t$, prior NAL units (e.g., $N_k$ through $N_{t-1}$ have been received at the decoder). The prior NAL units may be in the same group as the base NAL unit $N_t$.

The callback time illustrates the delivery of the NAL units from the hardware decoder to a callback function or the callback time is when the callback function is called by the hardware decoder. The callback function provides the NAL units to another application or a user by way of an application programming interface (API). In the example shown in FIG. 4, a short delay 141 is spaced between NAL unit $N_{t-2}$ and NAL unit $N_{t-1}$. A large delay 143 is spaced between NAL unit $N_{t-1}$ and NAL unit $N_t$. The delay between NAL units, including the short delay 141 and the large delay 143, may be measured from the beginning of one NAL unit to the beginning of the other NAL unit or measured from the end of one NAL unit to the beginning of the other NAL unit.

The display time illustrates that the delay has been smoothed out or shared between all of the NAL units in the group. As a result, the pausing phenomenon is avoided and the base NAL unit is displayed at the same time, or with a negligible delay 145, with the original display time.

Figure 5:
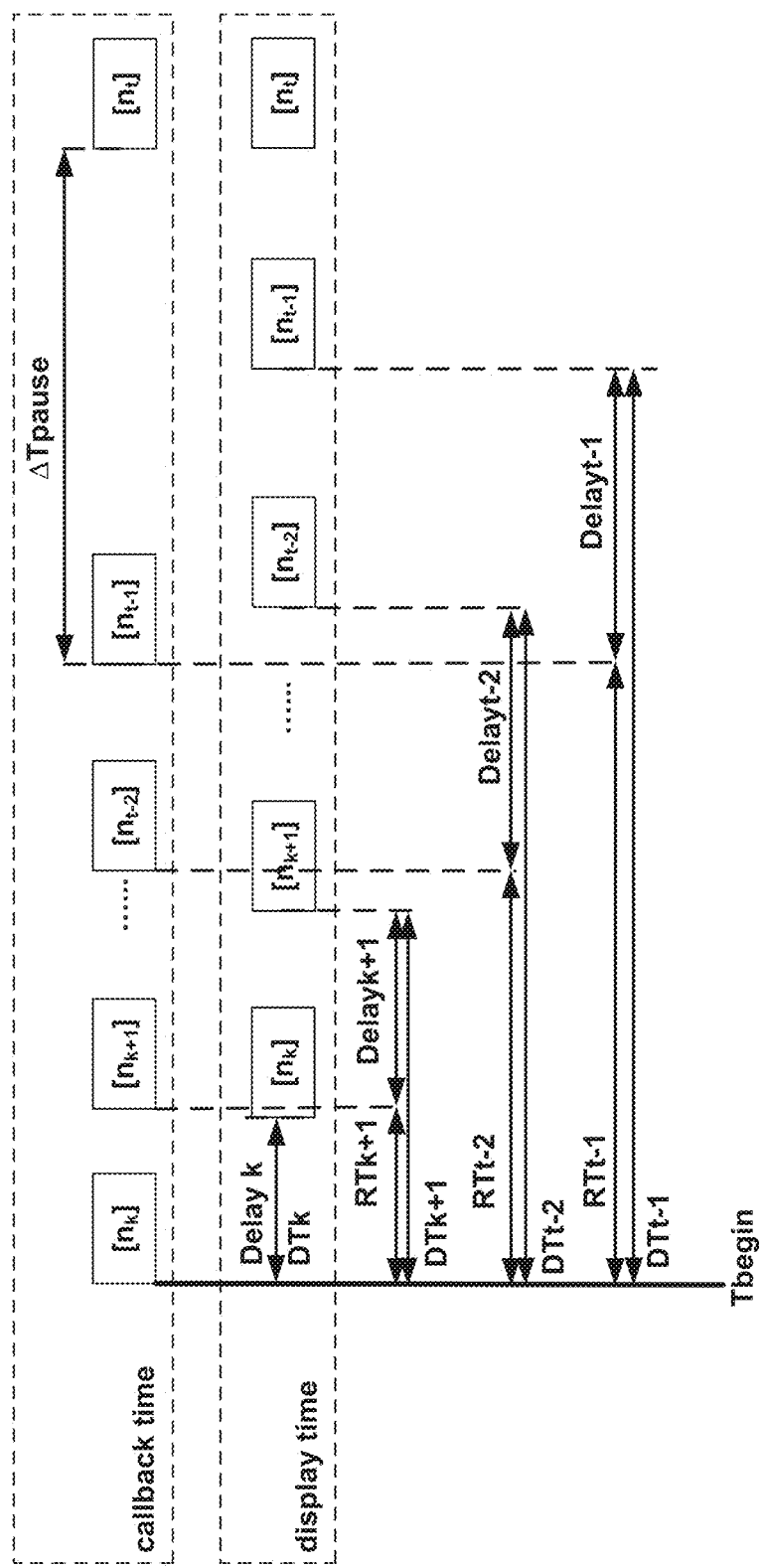
FIG. 5 illustrates an example delay calculation for delay tolerant decoding.

FIG. 5 illustrates an example delay calculation for delay tolerant decoding. $T_{begin}$ marks the series of video frames or NAL units. The average interval time ($\Delta T_{average}$) between consecutive decoded frames is estimated or measured by the local endpoint 107. The local endpoint 107 may measure the average interval time over an extended period of time. The extended period of time may be longer in duration than the series of video frames. Examples for the extended period of time include 1 day, 1 week, or 1 month. Alternatively, the extended period of time may be predetermined as a configurable setting (e.g., delay tolerance configuration value) for the local endpoint 107 entered by the user or developer. An application for delay tolerant decoding may include a lookup table that associates various extended periods of time with mobile device models or manufacturers.

After decoding the received video frames, the local endpoint 107 monitors the time spacing between the NAL units. When consecutive decoded video frames are spaced by more than the timeout threshold, a pause phenomenon delay ($\Delta T_{pause}$) is identified. For example, in FIG. 5 the pause phenomenon delay occurs between NAL units $n_{t-1}$ and $n_t$. The local endpoint 107 measures the pause phenomenon delay by subtracting the arrive time of $n_{t-1}$ from the arrive time of $n_t$.

The display time (DT) for each decoded NAL unit is the time interval between $T_{begin}$ and the time when the decoded NAL unit is displayed. The receipt time (RT) is the time interval between $T_{begin}$ and the callback time. The delay$_x$ is the calculated delay time for displaying the decoded result for NAL unit x measured from the corresponding callback time. Equations 1 and 2 are an example calculation for determining the delay time. The values for t and k are integer counters corresponding to the sequence of video frames or NAL units that increment moving from one NAL unit to the next. Lambda ($\lambda$) is a predetermined value that may be determined through experimentation (e.g., trial and error). Alternatively, lambda may be selected based on user preferences. Lambda may be a value between 0 and 1 (e.g., 0.3, 0.5, or 0.8). In one example, lambda is a mobile device constant defined by the manufacturer of the mobile device or through measuring performance of the mobile device in various delay scenarios.

$$\Delta T_{average} \times (t - k - 1) + \Delta T_{pause} = \lambda \times \Delta T + (t - k) \times \Delta T \quad \text{Eq. 1}$$

$$\Delta T = \frac{\Delta T_{average} \times (t - k - 1) + \Delta T_{pause}}{\lambda + (t - k)} \quad \text{Eq. 2}$$

Table 1 further illustrates application of delay tolerant encoding. The first column is the label for the video frame. The second column is the display time (DT). The third column is the receipt time (RT). The delay time of displaying each decoded result is calculated in the fourth column—Delay (DT−RT). If RT is equal to or larger than DT, the decoded result is displayed immediately. If RT is less than DT, the decoded result is delayed by (DT−RT) before displaying.

TABLE 1

| Frame | DT | RT | Delay (DT − RT) |
|---|---|---|---|
| [$n_k$] | $\lambda \times \Delta T$ | 0 | DT |
| [$n_{k+1}$] | $(\lambda + 1) \times \Delta T$ | $RT_{k+1}$ | $DT_{k+1} - RT_{k+1}$ |
| ... | | | |
| [$n_{t-2}$] | $(\lambda + t - k - 2) \times \Delta T$ | $RT_{t-2}$ | $DT_{t-2} - RT_{t-2}$ |
| [$n_{t-1}$] | $(\lambda + t - k - 1) \times \Delta T$ | $RT_{t-1}$ | $DT_{t-1} - RT_{t-1}$ |

In one example, when $RT_{t-1}+\Delta T_t$ is less than or equal to $\Delta T_{average} \times (t-k-1) - \Delta T_{pause}$, the total sum of time intervals is less than the calculated delay. Accordingly, the decoded NAL units or video frames are immediately displayed. When $RT_{t-1}+\Delta T_t$ is larger than $\Delta T_{average} \times (t-k-1) + \Delta T_{pause}$, then the total sum of time intervals is larger than the calculated delay. Accordingly, the delay time of the display decoded result for $n_t$ is $RT_{t-1}+\Delta T_t-(\Delta T_{average} \times (t-k-1)+\Delta T_{pause})$.

Therefore, the delay tolerant decoded identifies a pause phenomenon delay and divides the pause phenomenon over additional video frames in the group. The delay is smoothed so that the pausing phenomenon is less noticeable to the viewer.

Figure 6:
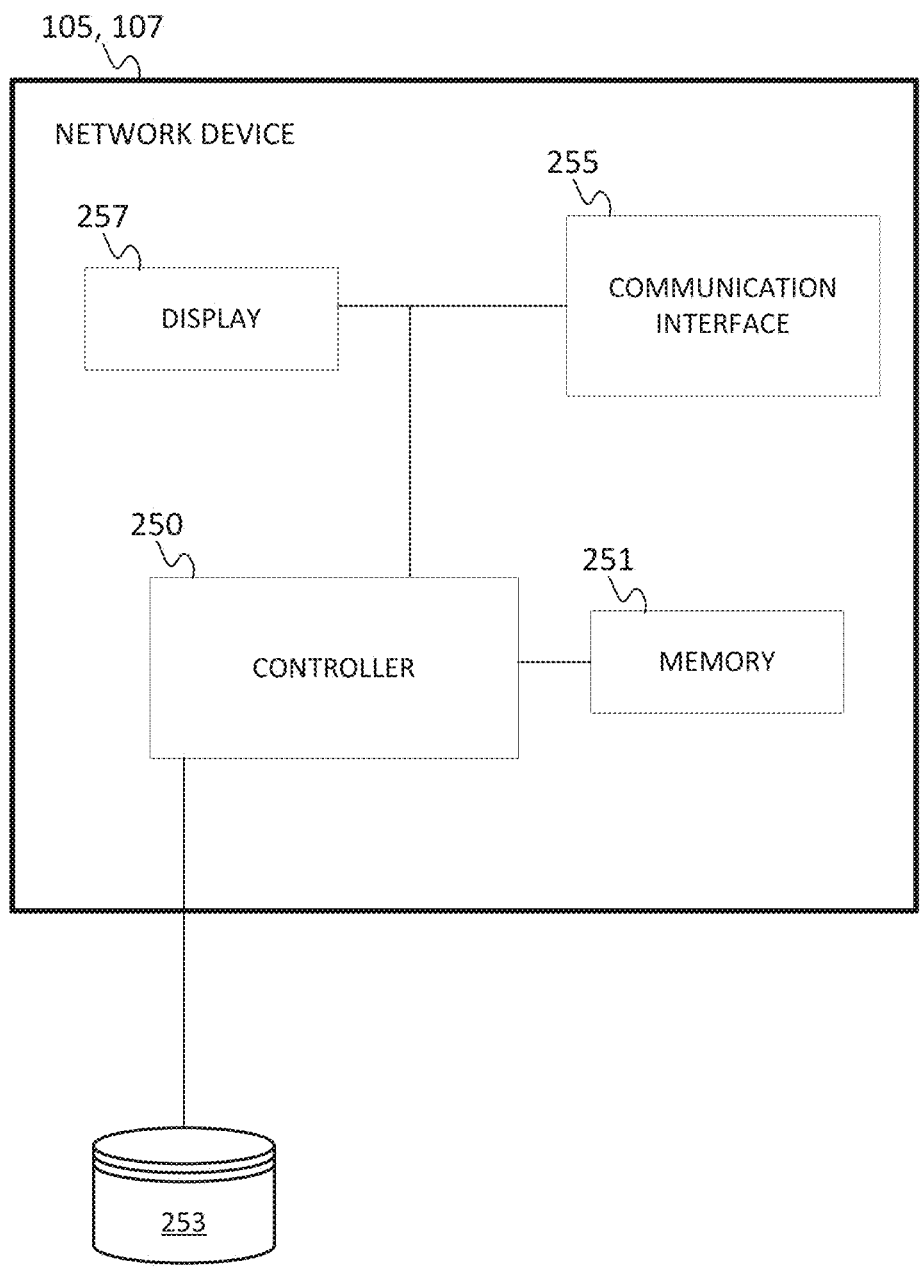
FIG. 6 illustrates an example endpoint in the system of FIG. 1.

FIG. 6 illustrates an example network device in the system of FIG. 1. The network device may be an endpoint or a server. The network device includes at least a memory 251, a controller 250, a display 257 and a communication interface 255. In one example, a database 253 stores the delay parameters. Additional, different, or fewer components may be provided. Different network devices may have the same or different arrangement of components.

The communication interface 255 is configured to receive a series of video frames spanning a predetermined series time period. The predetermined series time period may be set based on user input. The predetermined series time period defines the amount of time over which delay is averaged or smoothed out. That is, when a delayed NAL unit is received, the delay is shared among the other NAL unit in the predetermined series time period.

The controller 250 is configured to decode the series of video frames. Any decoding algorithm may be used. The controller 250 is configured to identify a pause phenomenon or time pause in the series of decoded frames. For example, each of the decoded frames may be stored in memory 251 along with a timestamp. The controller 250 is configured to subtract the time stamps of consecutive frames to compare the difference to a threshold. When the difference between two consecutive time frames or NAL units exceeds the threshold, the controller 250 flags the later frame or NAL unit as causing the time pause.

The controller 250 is configured to calculate a resultant delay period based on the time pause. In one example, the time pause is divided among all of the other frames (or NAL units) in the predetermined series time period. Other frames that would normally experience no delay are artificially delayed by some amount smaller than the time pause. The time pause may be divided evenly. For example, in a predetermined series time period including M frames and M−1 frame intervals, all of the intervals would be set to the duration of the time pause divided by M−1.

The display 257 is configured to display the series of decoded frames such that each successive pair of frames is spaced by the resultant delay period. The resultant time period is a function of the time pause and an expected delay time for the series of video frames. The expected delay time is measured over an extended time period or accessed from a delay tolerance configuration.

Figure 7:
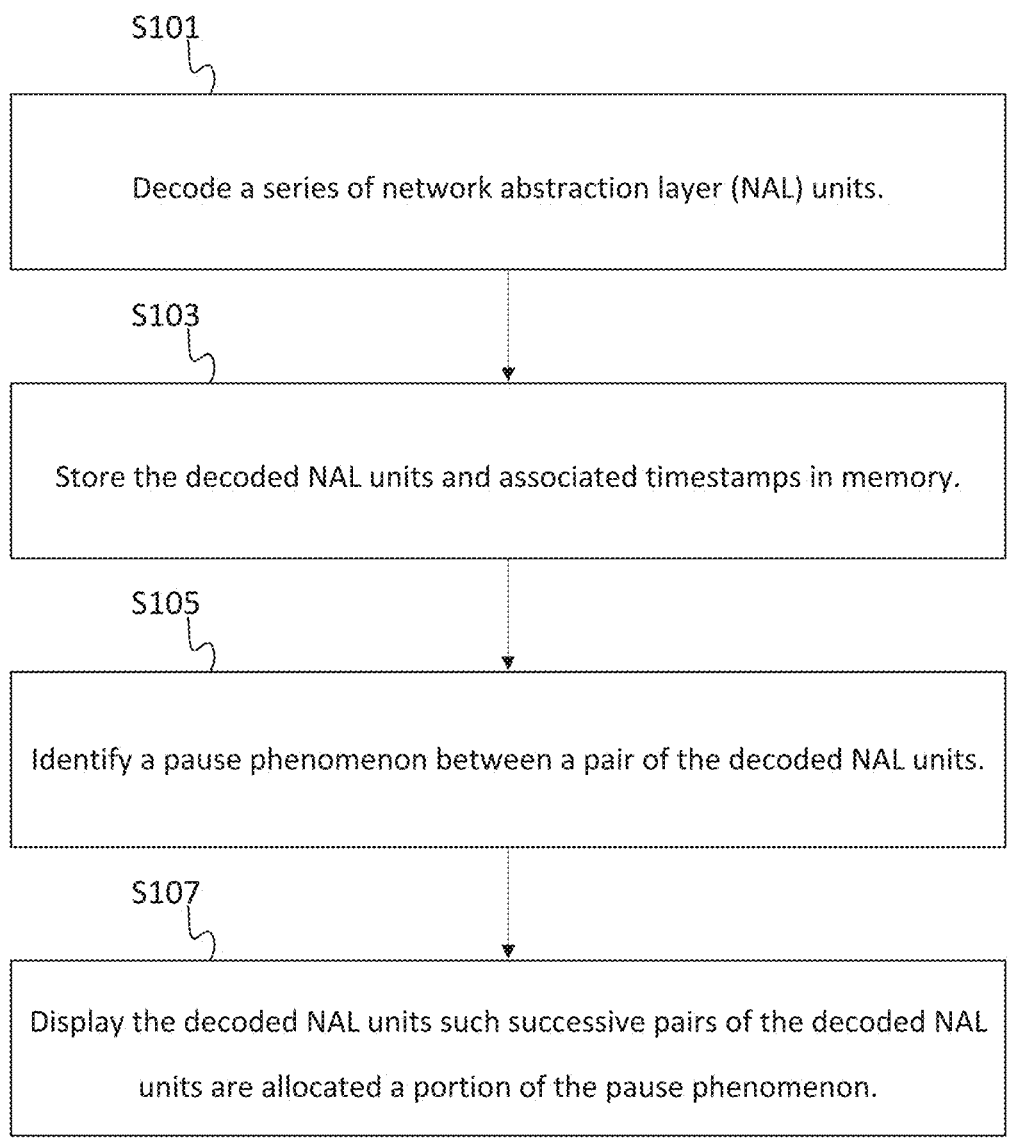
FIG. 7 illustrates an example flowchart for delay tolerant decoding by the endpoint of FIG. 6.

FIG. 7 illustrates an example flowchart for delay tolerant decoding by the endpoint of FIG. 6. Additional, different, or fewer acts may be provided. The acts are performed in the order shown or other orders. The acts may also be repeated. The acts may be performed by the local endpoint 107 or any of the network devices described above.

Initially, a video stream is established according to video encoding standard. NAL units are sent and received between two or more network devices. At act S101, the network device decodes a series of network abstraction layer (NAL) packets according to the video encoding standard units into decoded NAL units. The network device identifies video syntax in the NAL units and generates images based on the NAL units.

At act S103, the network device is configured to store the decoded NAL units and associated timestamps in memory or another type of buffer. The network device includes a timer which generates time values for each decoded NAL unit as it is stored in memory.

At act S105, the network device identifies a pause phenomenon between a pair of the decoded NAL units stored in the memory. The pause phenomenon is an amount of time between two adjacent NAL units that is in excess of the time defined by the frame rate of the video encoding standard. The pause phenomenon may be directly measured by the network device.

For example, the network device may be configured to calculate a difference between successive timestamps and compare the difference to a timeout threshold. Alternatively, the pause phenomenon may be inferred from the type of NAL unit. For example, the network device may identify the pause phenomenon based on a header bit in at least one of the NAL units.

At act S107, the network device is configured to display the decoded NAL units such that successive pairs of the decoded NAL units are allocated a portion of the pause phenomenon. In one example, the duration of the pause phenomenon is allocated to a predetermined number of NAL units adjacent to the subject NAL unit. For example, a set of preceding NAL units, a set of subsequent NAL units, or both may be allocated portions of the pause phenomenon. Example sizes for the set of preceding NAL units, the set of subsequent NAL units, or both may be 5 NAL units, 10 NAL units, or another integer value.

The network device may calculate the portion of the pause phenomenon as a function of the pause phenomenon and an average delay time of the expected delay between pairs of successive NAL units. The allocation of the portions of the pause phenomenon to the adjacent NAL units may be done evenly or as a function of the separation to the subject NAL unit. For example, more delay may be allocated to the nearest adjacent NAL units and less delay may be allocated to more distant adjacent NAL units. In one implementation, the nearest preceding NAL unit and the nearest subsequent NAL units are allocated 20% of the pause phenomenon time each, and the next nearest preceding NAL unit and the next nearest subsequent NAL units are allocated 10% of the pause phenomenon time each. The allocation may be 5% or another value for each iteration until all of the pause phenomenon time has been allocated or all of the frames in the group have been allocated.

Figure 8A:
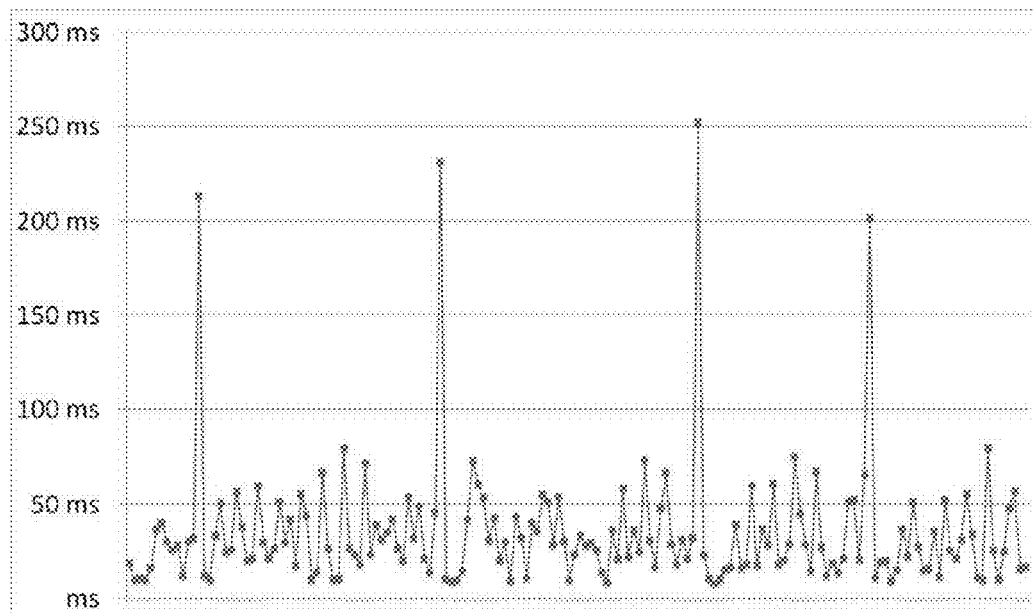
FIGS. 8A and 8B illustrate example test samples for delay tolerant decoding.
Figure 8B:
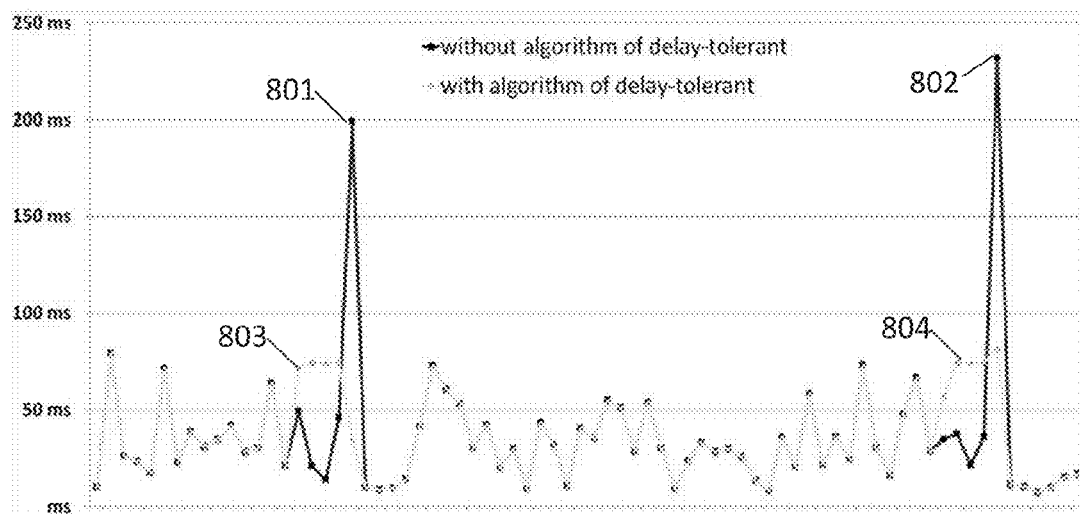

FIGS. 8A and 8B illustrate example test samples for delay tolerant decoding. FIG. 8A illustrates delay times for a series of NAL units. Most of the NAL units have negligible delay (i.e., delay appropriate for the frame rate of the vide stream). However, four of the NAL units are decoded with much more delay. Those NAL units may indicate abnormal behavior of the hardware decoded for some types of special frames or may indicate erratic transfer of the NAL units by the network.

FIG. 8B illustrates experimental results of the above embodiments. Referring to Equations 1 and 2, an average interval time was set to 30 milliseconds and lambda was set to 0.3. The timeout threshold was 150 milliseconds. The detected pause phenomenon delay ($\Delta T_{pause}$) was about 200 milliseconds in one instance of pause 801 and 230 milliseconds in another instance of pause 802. Through the delay tolerant algorithm, the pause instances were smoothed into smooth portions 803 and 804.

The controller 250 may include a general processor, digital signal processor, an application specific integrated circuit (ASIC), field programmable gate array (FPGA), analog circuit, digital circuit, combinations thereof, or other now known or later developed processor. The controller 250 may be a single device or combinations of devices, such as associated with a network, distributed processing, or cloud computing.

The memory 251 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device, such as a secure digital (SD) memory card.

The display 257 may be a liquid crystal display (LCD) panel, light emitting diode (LED) screen, thin film transistor screen, or another type of display. The user may specify the threshold levels, average time period, and lambda using an input device. The input device may be one or more buttons, keypad, keyboard, mouse, stylist pen, trackball, rocker switch, touch pad, voice recognition circuit, or other device or component for inputting data to the network device. The input device and the display 257 may be combined as a touch screen, which may be capacitive or resistive.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 251 or database 253) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry"

would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
  receiving, from a network, a series of video frames spanning a predetermined series time period;
  decoding the series of video frames as a series of decoded frames;
  storing the series of decoded video frames in a buffer;
  identifying a time pause between two of the decoded video frames;
  spreading the time pause from the two decoded video frames to a predetermined number of subsequent abstraction layer (NAL) units of decoded frames as a resultant delay period; and
  displaying the series of decoded frames such that the predetermined number of subsequent NAL units of decoded frames in the series of decoded frames are spaced by the resultant delay period that is allocated from the time pause and less than the time pause.

2. The method claim 1, wherein the time pause is associated with delay in the network.

3. The method claim 1, further comprising:
identifying a configuration set from the series of video frames, wherein the time pause is associated with the configuration set.

4. The method of claim 3, wherein the configuration set is a sequence parameter set or a picture parameter set.

5. The method of claim 1, further comprising:
assigning, to at least one video frame of the series of video frames, an arrived flag in response to an arrival time of the at least one video frame.

6. The method of claim 1, further comprising:
assigning, to at least one video frame of the series of video frames, a delayed flag in response to an arrival time of the at least one video frame.

7. The method of claim 1, wherein the resultant time period is a function of the time pause and an expected delay time.

8. The method of claim 7, wherein the resultant time period is dependent on a mobile device constant.

9. A method comprising:
receiving, from a network, a series of video frames spanning a predetermined series time period;
decoding the series of video frames as a series of decoded frames;
storing the series of decoded video frames in a buffer;
identifying a time pause between two of the decoded video frames; and
displaying the series of decoded frames such that at least one additional pair of decoded frames in the series of decoded frames are spaced by a resultant time period that is allocated from the time pause and less than the time pause,
wherein the resultant time period is a function of the time pause and an expected delay time and dependent on a mobile device constant, wherein the resultant time period is $\Delta T$, the time pause is $\Delta T_{pause}$, the expected delay time is $\Delta T_{average}$, t and k are counters, and the mobile device constant is $\lambda$, wherein $$\Delta T = \frac{\Delta T_{average} \times (t - k - 1) + \Delta T_{pause}}{\lambda + (t - k)}.$$

10. An apparatus comprising:
a communication interface that receives a series of video frames spanning a predetermined series time period; and
a controller that decodes the series of video frames as a series of decoded frames, identify a time pause between two of the decoded video frames, and calculates a resultant delay period for artificially spacing the series of decoded frames to spread the time pause from the two decoded video frames to at least one additional pair of decoded frames, wherein the resultant delay period is less than the time pause,
wherein the resultant delay period is a function of the time pause and an expected delay time, wherein the resultant time period is $\Delta T$, the time pause is $\Delta T_{pause}$, the expected delay time is $\Delta T_{average}$, t and k are counters, wherein:

$$\Delta T = \frac{\Delta T_{average} \times (t - k - 1) + \Delta T_{pause}}{(t - k)}.$$

11. The apparatus of claim 10, further comprising:
a display that displays the series of decoded frames such that successive pairs of frames are spaced by the resultant delay period.

12. The apparatus of claim 10, wherein the time pause is associated with delay in the network.

13. The apparatus of claim 10, wherein the time pause is associated with a configuration set from the series of video frames, wherein the configuration set defines a resolution or a frame rate of the series of video frames.

14. The apparatus of claim 10, wherein the time pause is associated with analysis of a sequence parameter set or a picture parameter set.

15. The apparatus of claim 10, wherein the resultant time period is a function of the time pause and an expected delay time for the series of video frames.

16. The apparatus of claim 15, wherein the expected delay time is measured over an extended time period or accessed from a delay tolerance configuration.

17. A non-transitory computer readable medium including instructions that when executed are configured to cause a processor to:
decode a series of network abstraction layer (NAL) units into decoded NAL units;
store the decoded NAL units and associated timestamps in memory;
identify a pause phenomenon between a pair of the decoded NAL units;
spread the pause phenomenon from the pair of the decoded NAL units to at least one additional pair of the decoded NAL units as a resultant delay period such that the at least one additional pair of the decoded NAL units are allocated a portion of the pause phenomenon as the resultant delay period; and
display the decoded NAL units in a video stream,
wherein the resultant time period is a function of the time pause and an expected delay time and dependent on a mobile device constant.

18. The non-transitory computer readable medium of claim 17, wherein the pause phenomenon is identified based on a header bit in at least one of the pair of the decoded NAL units.

19. The non-transitory computer readable medium of claim 17, wherein the pause phenomenon is identified based on a comparison of successive timestamps.

20. The non-transitory computer readable medium of claim 17, the instructions further configured to:
calculate the portion of the pause phenomenon as a function of the pause phenomenon and an average delay time.

* * * * *